United States Patent [19]

Kurosu et al.

[11] Patent Number: 4,462,672
[45] Date of Patent: Jul. 31, 1984

[54] CONTROL CIRCUIT FOR AN ELECTROMAGNETICALLY DRIVEN PROGRAMMING SHUTTER

[75] Inventors: Tomio Kurosu, Iwatsuki; Yukio Yoshikawa, Tokyo, both of Japan

[73] Assignee: Copal Company Limited, Tokyo, Japan

[21] Appl. No.: 469,508

[22] Filed: Feb. 24, 1983

[30] Foreign Application Priority Data

Mar. 1, 1982 [JP] Japan .................................. 57-32097
Mar. 1, 1982 [JP] Japan .................................. 57-32098

[51] Int. Cl.³ ...................... G03B 7/087; G03B 7/097
[52] U.S. Cl. .................................. 354/435; 354/458; 354/234.1
[58] Field of Search ............ 354/435, 440, 458, 234.1

[56] References Cited
U.S. PATENT DOCUMENTS 4,375,915  3/1983  Uchidor et al. .................. 354/234.1

Primary Examiner—Michael L. Gellner
Attorney, Agent, or Firm—McAulay, Fields, Fisher, Goldstein & Nissen

[57] ABSTRACT

The electromagnetically driven programming shutter includes magnets and shutter blade driving coils provided on the respective shutter blades of the shutter and electromagnetically cooperating with the magnets and the shutter blades are actuated for opening and/or closing operation when the driving coils are energized. The present invention provides a votage compensating circuit used as the reference voltage generating circuit which is capable of varying the reference output voltage as a function of the variation in the voltage of the electric source, thereby permitting the controlled proper exposure defining output pulse to be modified so as to compensate for the variation in the actuation of the shutter blades caused by the variation in the electromagnetic force generated by the shutter blade driving coils due to the variation in the voltage of the electric source. Alternatively, a temperature detecting circuit may be provided for detecting the temperature of the shutter blade driving coils indicative of the variation in the current flowing through the driving coils and, hence, indicative of the variation in the electromagnetic force given to the shutter blades, and the temperature detecting circuit is connected to the reference voltage generating circuit. The temperature detecting circuit has such a temperature characteristics that the reference output voltage is modified by the temperature detecting circuit in response to the variation in the temperature thereby permitting the variation in the actuation of the shutter blades caused by the variation in the temperature to be compensate for in order to obtain a proper exposure of the shutter.

13 Claims, 14 Drawing Figures

Fig. 6  PHOTOGRAPH IN THE STATE OF LOWERED Vcc

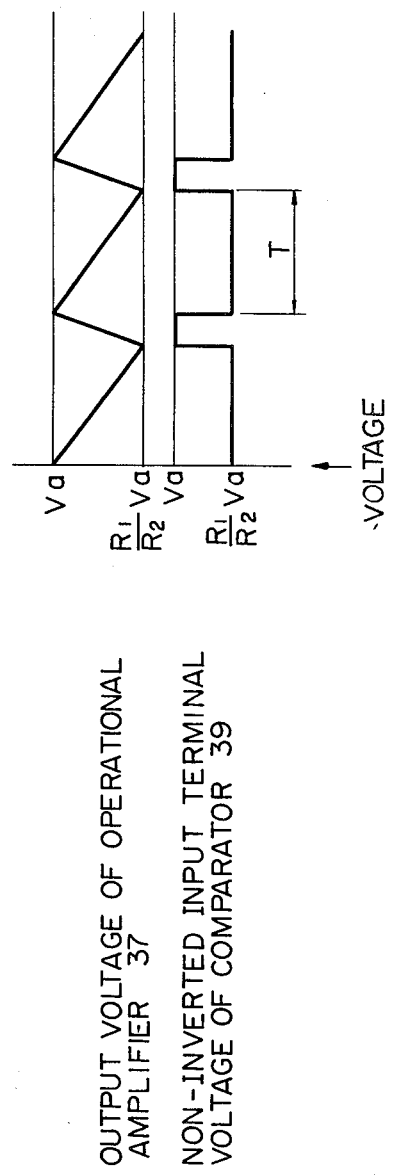

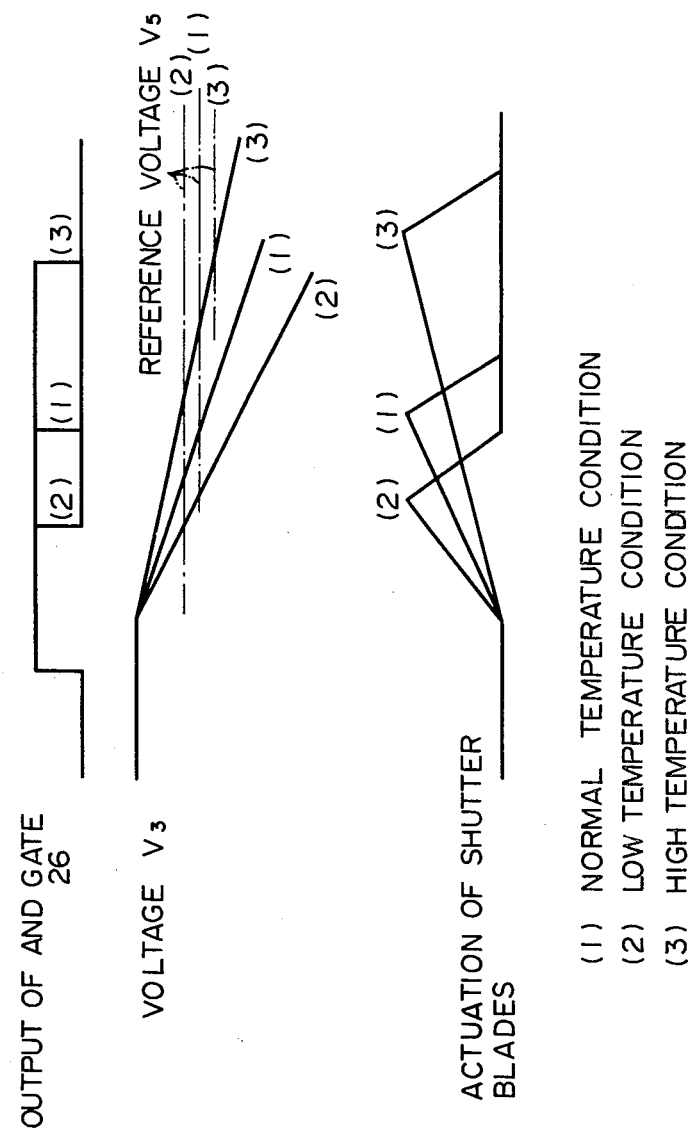

CONTROL CIRCUIT FOR AN ELECTROMAGNETICALLY DRIVEN PROGRAMMING SHUTTER

BACKGROUND OF THE INVENTION

The present invention relates to a control circuit for an electromagnetically driven programming shutter of a camera.

An electromagnetically driven programming shutter suffers from a large variation in its performance caused by the variation in the voltage or the current of the electric source energizing the shutter. Therefore, it has been the practice in the heretofore proposed electromagnetically driven programming shutter to provide a constant voltage circuit or a constant current circuit so as to prevent the variation in the performance of the shutter caused by the variation in the voltage or the current of the electric source energizing the shutter. However, the constant voltage circuit or the constant current circuit is very complex in construction and expensive to manufacture, while the voltage or the current supplied from such a constant voltage circuit or a constant current circuit is not used under the completely efficient conditions of the electric source but rather in a very low efficiency of the electric source in order to obtain the constant voltage or the constant current. Therefore, it is disadvantageous to use such a constant voltage circuit or a constant current circuit in an electromagnetically driven programming shutter requiring a rather large current.

On the other hand, an electromagnetically driven programming shutter suffers from a large variation in its performance caused by the variation in the temperature resulting in the variation of the voltage or the current supplied by the electric source to the shutter. Therefore, an expensive constant voltage circuit or an expensive constant current circuit has been required in the shutter in order to avoid the variation in the performance caused by the variation in the temperature. This has been a disadvantage in the heretofore proposed electromagnetically driven programming shutter.

SUMMARY OF THE INVENTION

It is, therefore, an object of the present invention to provide a novel and useful control circuit for an electromagnetically driven programming shutter which is simple in construction and inexpensive to manufacture and has a superior performance wherein the electric source can be utilized in the most efficient manner and the accurate operation of the shutter is insured even though the voltage of the electric source varies.

The other object of the present invention is to provide a novel and useful control circuit for an electromagnetically driven programming shutter which is simple in construction and inexpensive to manufacture and has a superior performance wherein the electric source can be utilized in the most efficient manner and the accurate operation of the shutter is insured even though the temperature varies.

The above object is achieved in accordance with the present invention by providing a control circuit for an electromagnetically driven programming shutter having magnets and shutter blade driving coils provided on the respective shutter blades of said shutter and electromagnetically cooperating with the magnets, the shutter blades being actuated for opening and/or closing operation when the driving coils are energized, the control circuit having an electric source for energizing the driving coils, a scene light information detecting circuit including a photoelectric element adapted to receive the scene light in coupled relationship to the opening and closing operation of the shutter blades so as to generate a scene light information indicating output voltage, a reference voltage generating circuit adapted to be energized by the electric source so as to generate a reference output voltage for obtaining a proper exposure of the shutter by comparing the same with the scene light information indicating output voltage, and a comparator adapted to receive the scene light information indicating output voltage and the reference output voltage and compare the former with the latter so as to generate a controlled proper exposure defining output pulse, the controlled proper exposure defining output pulse being supplied to the shutter blade driving coils so that the shutter is actuated for the proper exposure in cooperation with the magnets, the control circuit being characterized in that the reference voltage generating circuit comprises a voltage compensating circuit capable of varying the reference output voltage as a function of the variation in the voltage of the electric source thereby permitting the controlled proper exposure defining output pulse to be modified so as to compensate for the variation in the actuation of the shutter blades caused by the variation in the electromagnetic force generated by the shutter blade driving coils due to the variation in the voltage of the electric source.

With the above described control circuit of the present invention, the variation in the actuation of the shutter blades due to the variation in the voltage of the electric source can be positively compensated for in order to achieve the proper exposure of the shutter by taking advantage of the variation in the voltage per se of the electric source so as to modify the duration of the controlled proper exposure defining pulse without the need of providing any expensive constant voltage or current circuit.

The voltage compensating circuit may comprise a circuit for varying the duration of the controlled proper exposure defining output pulse in response to the variation in the voltage of the electric source.

The electromagnetically driven programming shutter may comprise springs for urging the respective shutter blades to the closed position of the shutter, the shutter blades being driven in the shutter opening direction against the action of said springs when the shutter blade driving coils are energized by the controlled proper exposure defining output pulse.

In accordance with another feature of the present invention, it provides a control circuit for an electromagnetically driven programming shutter having magnets and shutter blade driving coils provided on the respective shutter blades and electromagnetically cooperating with the magnets, the shutter blades being actuated for opening and/or closing operation when the driving coils are energized, the control circuit having an electric source for energizing the driving coils, a scene light information detecting circuit including a photoelectric element adapted to receive the scene light so as to generate a scene light information indicating output voltage, a reference voltage generating circuit adapted to be energized by the electric source so as to generate a reference output voltage for obtaining a proper exposure of the shutter by comparing the same with the scene light information indicating output voltage, and a comparator adapted to receive the scene light information indicating output voltage and the reference output voltage and compare the former with the latter so as to generate a controlled proper exposure defining output pulse, the controlled proper exposure defining output pulse being supplied to the shutter blade driving coils so that the shutter is actuated for the proper exposure in cooperation with the magnets, the control circuit being characterized in that the reference voltage generating circuit comprises a voltage compensating circuit capable of varying the reference output voltage as a function of the variation in the voltage of the electric source thereby permitting the controlled proper exposure defining output pulse to be modified so as to compensate for the variation in the actuation of the shutter blades caused by the variation in the electromagnetic force generated by the shutter blade driving coils due to the variation in the voltage of the electric source, and the control circuit further comprises a first digital conversion circuit for converting the scene light information indicating output voltage into a digital scnee light information indicating output signal, a second digital conversion circuit for converting the reference output voltage of the voltage compensating circuit into a digital reference output signal, and an operation processing circuit adapted to receive both the digital output signals so as to generate the controlled proper exposure defining output pulse by the operation processing circuit.

The control circuit described above may further comprise an information introducing circuit for introducing an exposure information such as the film sensitivity into the operation processing circuit.

In accordance with a still further feature of the present invention, it provides a control circuit for an electromagnetically driven programming shutter having magnets and shutter blade driving coils provided on the respective shutter blades and electromagnetically cooperating with the magnets, the shutter blades being actuated for opening and/or closing operation when the driving coils are energized, the control circuit having an electric source for energizing the driving coils, a scene light information detecting circuit including a photoelectric element adapted to receive the scene light so as to generate a scene light information indicating output voltage, a reference voltage generating circuit adapted to be energized by the electric source so as to generate a reference output voltage for obtaining a proper exposure of the shutter by comparing the same with the scene light information indicating output voltage, and a comparator adapted to receive the scene light information indicating output voltage and the reference output voltage and compare the former with the latter so as to generate a controlled proper exposure defining output pulse, the controlled proper exposure defining output pulse being supplied to the shutter blade driving coils so that the shutter is actuated for the proper exposure in cooperation with the magnets, the control circuit being characterized in that the reference voltage generating circuit comprises a voltage compensating circuit capable of varying the reference output voltage as a function of the variation in the voltage of the electric source thereby permitting the controlled proper exposure defining output pulse to be modified so as to compensate for the variation in the actuation of the shutter blades caused by the variation in the electromagnetic force generated by the shutter blade driving coils due to the variation in the voltage of the electric source, and the control circuit further comprises a first digital conversion circuit for converting the scene light information indicating output voltage into a digital scene light information indicating output signal, a second digital conversion circuit for converting the reference output voltage of the voltage compensating circuit into a digital reference output signal, an operation processing circuit adapted to receive both the digital output signals so as to generate a shutter blade opening signal and a shutter blade closing signal which is issued after a controlled time period from the issuance of the shutter blade opening signal corresponding to the scene light information indicating signal as well as to the variation in the voltage of the electric source, and a shutter blade actuating circuit adapted to receive the shutter blade opening signal and the shutter blade closing signal, the shutter blade driving coils being energized upon supply of the shutter blade opening signal to the shutter blade actuating circuit in the direction for driving the shutter blades in the shutter opening direction, while the shutter blade driving coils are switched upon supply of the shutter blade closing signal to the shutter blade actuating circuit so as to be energized in the direction for driving the shutter blades in the shutter closing direction, further comprising an information introducing circuit for introducing an exposure.

In accordance with a further feature of the present invention, it provides a control circuit for an electromagnetically driven programming shutter having magnets and shutter blade driving coils provided on the respective shutter blades of the shutter and electromagnetically cooperating with the magnets, the shutter blades being actuated for opening and/or closing operation when the driving coils are energized, the control circuit having an electric source for energizing the driving coils, a scene light information detecting circuit including a photoelectric element adapted to receive the scene light in coupled relationship to the opening and closing operations of the shutter blades so as to generate a scene light information indicating output voltage, a reference voltage generating circuit adapted to be energized by the electric source so as to generate a reference output voltage for obtaining a proper exposure of the shutter by comparing the same with the scene light information indicating output voltage, and a comparator adapted to receive the scene light information indicating output voltage and the reference output voltage and compare the former with the latter so as to generate a controlled proper exposure defining output pulse, the controlled proper exposure defining output pulse being supplied to the shutter blade driving coils so that the shutter is actuated for the proper exposure in cooperation with the magnets, the control circuit being characterized in that the reference voltage generating circuit comprises a voltage compensating circuit capable of varying the reference output voltage as a function of the variation in the voltage of the electric source, a scene light information compensating means for varying the brightness of the scene light received by the photoelectric element, and driving means controlled by the voltage compensating circuit for driving the scene light information compensating means so as to vary the brightness of the scene light received by the photoelectric element correspondingly to the output of the voltage compensating circuit, thereby permitting the controlled proper exposure defining output pulse to be modified so as to compensate for the variation in the actuation of the shutter blades caused by the variation in the electromagnetic force generated by the shutter blade driving coils due to the variation in the voltage of the electric source.

The scene light information compensating means may comprise a variable aperture diaphragm located in front of the photoelectric element, or it may comprise a variable density neutral gray wedge type filter located in front of the photoelectric element.

With the control circuit described above, the controlled proper exposure defining pulse can be modified so as to compensate for the variation in the actuation of the shutter blades caused by the variation in the voltage of the electric source in order to achieve the proper exposure by modifying the brightness of the scene light received by the photoelectric element correspondingly to the variation in the voltage of the electric source without the used of providing any expensive constant voltage or current circuit.

In accordance with the other feature of the present invention, it provides an electromagnetically driven programming shutter having magnets and shutter blade driving coils provided on the respective shutter blades of the shutter and electromagnetically cooperating with the magnets, the shutter blades being actuated for opening and/or closing operation when the driving coils are energized, the control circuit having an electric source for energizing the driving coils, a scene light information detecting circuit including a photoelectric element adapted to receive the scene light in coupled relationship to the opening and closing operations of the shutter blades so as to generate a scene light information indicating output voltage, a reference voltage generating circuit adapted to be energized by the electric source so as to generate a reference output voltage for obtaining a proper exposure of the shutter by comparing the same with the scene light information indicating output voltage, and a comparator adapted to receive the scene light information indicating output voltage and the reference output voltage and compare the former with the latter so as to generate a controlled proper exposure defining output pulse, the controlled proper exposure defining output pulse being supplied to the shutter blade driving coils so that the shutter is actuated for the proper exposure in cooperation with the magnets, the control circuit being characterized by a temperature detecting circuit having a predetermined temperature characteristics and arranged at a position where the temperature of the shutter blade driving coils can be detected thereby, the temperature detecting circuit being connected to the reference voltage generating circuit thereby permitting the reference output voltage to be modified by virtue of the temperature characteristics of the temperature detecting circuit so as to compensate for the variation in the actuation of the shutter blades caused by the variation in the electromagnetic force generated by the shutter blade driving coils due to the variation in the temperature.

With the control circuit described above, the accurate operation of the shutter is insured even though the temperature varies by virtue of the provision of the temperature detecting circuit for modifying the reference output voltage so as to compensate for the variation in the actuation of the shutter blades caused by the variation in the temperature.

BRIEF DESCRIPTION OF THE DRAWINGS

FIG. 8 is a diagram showing the operating voltage of the control circuit of FIG. 7;

FIG. 14 is a diagram showing the variation in the operation of the control circuit of FIG. 12 as well as the variation in the operation of the shutter blades.

DETAILED DESCRIPTION OF THE PREFERRED EMBODIMENTS

Figure 1:
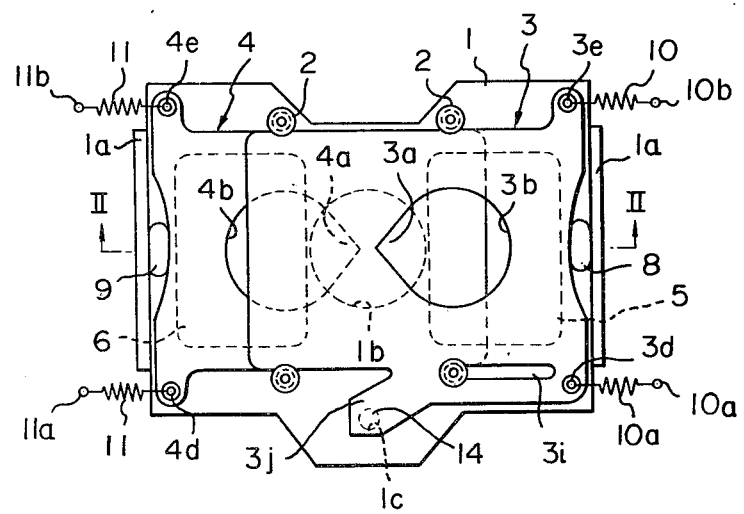
FIG. 1 is a plan view showing the main portion of the electromagnetically driven programming shutter suitable for use with the control circuit of the present invention.
Figure 2:
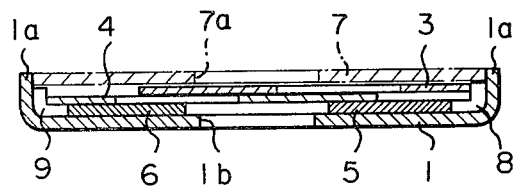
FIG. 2 is a cross-sectional view taken along line II—II in FIG. 1.

Referring now to FIGS. 1 and 2 showing the electromagnetically driven programming shutter suitable for use with the control circuit of the present invention, it comprises a lower magnetizable yoke 1 having a central light transmitting opening 1b and a plurality of guide rollers 2 provided thereon, shutter blades 3 and 4 located above the lower yoke 1 with their side edges and elongated slot 3i formed in the shutter 3 being guided by the guide rollers 2 for reciprocal movement of the shutter blades 3 and 4, each of the shutter blades 3 and 4 being formed of a light intercepting material such as a glass fiber embedded epoxy resin having an electrically insulating property so as to serve as a base plate of a printed coil and having a teardrop-shaped light transmitting window 3b, 4b with the sharpened tip 3a, 4a thereof being oriented in facing relationship to each other as shown, a pair of permanent magnets 5 and 6 secured on the inner surface of the lower yoke 1 beneath the shutter blades 3, 4 and each having a vertically oriented but inverted magnetic polarity to each other, and an upper magnetizable yoke 7 arranged above the shutter blades 3, 4 and having a central light transmitting opening 7a with its opposite end edges abutting against the respective upwardly bent lugs 1a of the lower yoke 1.

The location of the magnets 5 and 6 is defined by stoppers 8, 9 arranged in the lower yoke 1 which serve also as the motion limiting means for the shutter blades 3 and 4.

Electrically conducting tension springs 10, 10 are stretched between electrically conducting pins 3d, 3e secured to the shutter blade 3 and electrically conducting pins 10a, 10b secured to a base plate (not shown) of the shutter, respectively. In like manner, electrically conducting tension springs 11, 11 are stretched between electrically conducting pins 4d, 4e secured to the shutter blade 4 and electrically conducting pins 11a, 11b secured to the base plate of the shutter, so that the shutter blade 3 is normally urged to the right in FIG. 1 to abut against the stopper 8 while the shutter blade 4 is normally urged to the left to abut against the stopper 9. In this position, the sharpened tips 3a, 4a of the windows 3b, 4b are moved spaced apart from each other so that the light transmitting openings 1b and 7a are fully covered by the shutter blades 3, 4 thereby preventing the light from passing through the openings 1b and 7a.

When the shutter blade 3 is urged to the left and the shutter blade 4 is urged to the right simultaneously and symmetrically to the shutter blade 3 against the action of the springs 10, 11 by the operation of the shutter to be described later, the sharpened tips 3a, 4a move toward each other and begin to overlap with each other so that a small light transmitting aperture is formed by the tips 3a, 4a at the center of the window 1b, and the size of this small light transmitting aperture becomes greater as the shutter blade 3 continues to move to the left and the shutter blade 4 continues to move to the right symmetrically to the shutter blade 3 until the shutter blade 3 abuts against the stopper 9 and the shutter blade 4 abuts against the stopper 8, at which positions the windows 3b, 4b and the opening 1b are concentric to each other and the shutter blades 3, 4 form the fully opened aperture.

When the movement of the shutter blades 3, 4 is reversed to the shutter closing direction before they reach the fully opened aperture, the shutter operates as a programming shutter.

The magnetic circuit of the magnets 5, 6 is completed through the magnet 5 - the yoke 7 - the magnet 6 - the yoke 1 - the magnet 5.

In order to move the shutter blades 3, 4 in the shutter opening direction against the action of the springs 10, 11, a shutter blade driving coil 13 in the form of a printed coil is provided on the shutter blade 3 and a shutter blade driving coil similar to the driving coil 13 is provided on the shutter blade 4. Therefore, it will suffice to describe only the shutter blade driving coil 13 in detail for the understanding of the shutter blade driving coil provided on the shutter blade 4.

Figure 3:
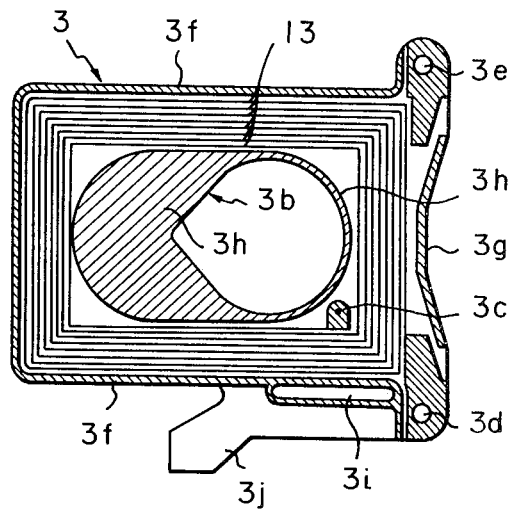
FIG. 3 is a plan view showing the shutter blade driving coil provided on the shutter blade of the shutter shown in FIG. 1.

As shown in FIG. 3, the shutter blade driving coil 13 is formed over one surface or both surfaces of the shutter blade 3 by adhesion of a metallic foil such as a copper foil thereon or by vacuum vaporization of a metal such as copper thereon and, thereafter, by effecting etching process so as to form the desired configuration of the coil. In case the coil is formed only on one surface, the ends of the coil is connected to the pins 3d, 3e, respectively, while, in case the coil is formed on both surfaces, one end of the coil on one surface is connected to the pin 3d and the other end is connected to an electrically conducting pin 3c passing through the shutter blade 3 and the pin 3c is connected to one end of the coil on the opposite surface of the shutter blade 3 and the other end of this coil is connected to the pin 3e so that the coil 13 can be energized by the control circuit to be described below through the pin 10a, the spring 10, the pin 3d and through the pin 3e, the spring 10, the pin 10b, thereby permitting an electromagnetic force to be generated by the coil 13 in cooperation with the magnets 5, 6 so as to move the shutter blade 3 against the action of the springs 10 in the shutter opening direction. When the coil 13 is deenergized by the operation of the control circuit, the shutter blade 3 is moved to the shutter closing position by the action of the springs 10. In the similar manner, the shutter blade 4 is moved in symmetrical relationship to the shutter blade 3 by the energization of the coil provided thereon by the control circuit through the pin 11a, the spring 11, the pin 4d and through the pin 4e, the spring 11, the pin 11b in cooperation with the magnets 5, 6 and the deenergization of the coil by the action of the springs 11 under the control of the control circuit. Therefore, a proper exposure is achieved by the shutter by the operation of the control circuit.

It is preferred to provide wear-resisting areas 3f, 3g made of the same material as that of the shutter blade driving coils on both surfaces of the shutter blades at the same time and by one and the same process as the shutter blade driving coils are formed. The areas 3f, 3g significantly improve the wear-resisting property of the relatively sliding portions of the shutter.

Further, it is also preferred to provide a metallic light intercepting area (as shown by the reference numeral 3h in FIG. 3) made of the same material as that of the shutter blade driving coil at the same time and by one and the same process as the shutter blade driving coils are formed. The area 3h serves to significantly improve the light intercepting property of the shutter blades which otherwise could not be achieved by the shutter blades made of a resin.

Now, an embodiment of the control circuit of the present invention will be described below with reference to FIG. 4.

Figure 4:
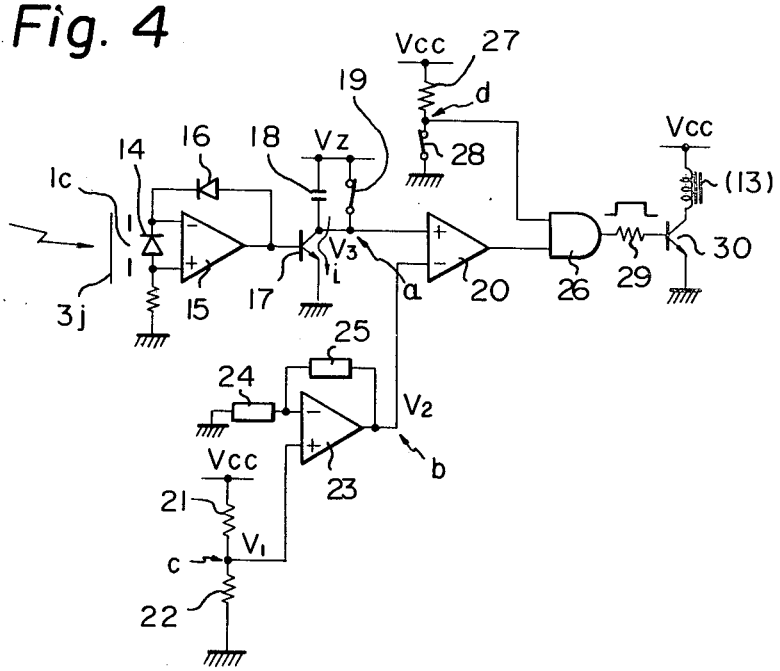
FIG. 4 is a diagram showing an embodiment of the control circuit of the present invention.

The control circuit shown in FIG. 4 incldes a photoelectric element 14 located in the recess 1c formed in the lower yoke 1. The photoelectric element 14 is covered or shielded by a shielding lug 3j extending obliquely outwardly from the shutter blade 3 so as to prevent the scene light from being received by the photoelectric element 14 when the shutter blades 3, 4 are in the shutter closing position, but, as the shutter blades 3, 4 begin to move in the shutter opening direction, the shielding lug 3j begins to gradually uncover the photoelectric element 14 so that it begins to receive gradually increasing quantity of the scene light in coupled relation to the movement of the shutter blade 3, and it is again covered by the shielding lug 3j when the shutter blades 3, 4 move to the shutter closing position.

The control circuit comprises a scene light information detecting circuit consisting of an operational amplifier 15 having input terminals connected to the photoelectric element 14 and having a logarithmic diode or a logarithmically suppressing diode 16 connected between the output terminal of the operational amplifier 15 and the inverted input terminal thereof for feeding back the output of the operational amplifier 15 to the inverted input terminal, a logarithmic extension transistor or a logarithmically stretching transistor 17 having its base connected to the output teminal of the operational amplifier 15 and having its emitter grounded, a capacitor 18 connected between a constant voltage source $V_2$ and the collector of the transistor 17 and a trigger switch 19 connected in parallel to the capacitor 18 between the constant voltage source $V_2$ and the collector of the transistor 17, the trigger switch being normally closed bit being adopted to be opened in advance of the receipt of the scene light by the photoelectric element 14 in coupled relationship to the opening operation of the shutter blades 3, 4.

The output voltage of the scene light information detecting circuit is supplied to the non-inverted input terminal of a comparator 20, while a reference output voltage $V_2$ of a reference voltage generating circuit is supplied to the inverted input terminal of the comparator 20 so that both the output voltages are compared with each other in the comparator 20 thereby determining the level of the output of the comparator 20 depending upon the scene light brightness for controlling the energization and the deenergization of the shutter blade driving coils for achieving the proper exposure of the shutter as described in detail hereinbelow.

The reference voltage generating circuit comprises a voltage dividing circuit including a pair of series connected resistors 21, 22 for dividing the voltage $V_{cc}$ of the electric source such as a battery at the connecting point C for providing a divided voltage $V_1$ thereat, an operational amplifier 23 having its non-inverted input terminal connected to the connecting point C of the voltage dividing circuit and its inverted input terminal connected to one end of a resistor 24 the other end of which is grounded, and a feed-back resistor 25 connected between the output terminal of the operational amplifier 23 and the inverted input terminal thereof. The output terminal of the operational amplifier 3 is connected to one input terminal of an AND gate 26 for supplying the reference output voltage $V_2$ thereto. One end of a resistor 27 is connected to the electric source Vcc while the other end thereof is connected to one end of a release switch 28 the other end of which is grounded. The connecting point d of the resistor 27 and the release switch 28 is connected to the other input terminal of the AND gate 26. The output terminal of the AND gate 26 is connected to one end of a resistor 29 the other of which is connected to the base of a transistor 30. The collector of the transistor is connected to one end each of the shutter blade driving coils of the shutter blades 3, 4, the other end of which is connected to the electric source Vcc, while the emitter of the transistor 30 is grounded. The connection of the driving coils, i.e. the direction of the current to be flown through the driving coils when they are energized is so determined that the shutter blades 3, 4 are driven in the shutter opening direction against the action of the springs 0, 11.

The release switch 28 is normally closed and it is opened when the release button of the camera is operated for the photographing operation.

The operation of the control circuit as described above is as follows. Prior to the actuation of the release button of the camera, both the release switch 28 and the trigger switch 19 are closed and, therefore, the non-inverted input terminal of the comparator 20 receives the constant voltage $V_2$ which is higher than the reference voltage $V_2$ supplied to the inverted input terminal of the comparator 20 so that the output of the comparator 20 is at the H level which is supplied to one input terminal of the AND gate 26, but the other input terminal of the AND gate 26 is at the L level because the release switch 28 is held closed so as to ground the electric source. Thus, the output of the AND gate 26 is at the L level so that the transistor 30 is in the non-conductive condition and no current is flown through the shutter blade driving coils thereby maintaining the shutter blades 3, 4 in the shutter closing positions.

When the release button is actuated for operating the shutter, the release switch 28 is opened so that the voltage $V_{cc}$ of the electric source is supplied to the above described other input terminal of the AND gate 26 the above described one input terminal of which has been kept at the H level as described previously, and, therefore, the AND gate 26 is opened so as to render the output thereof to be at H level thereby rendering the transistor 30 to be conductive to flow the current through the shutter blade driving coils. Thus, the shutter blades 3, 4 are moved in the shutter opening direction against the action of the springs 3, 4.

As the shutter blades 3, 4 move to open the shutter, the trigger switch 19 is opened before the photoelectric element 14 begins to receive the scene light. And then, as the shielding lug $3j$ of the shutter blade 3 uncovers the photoelectric element 14, it receives gradually the scene light while the sharpened tips $3a$, $4a$ of the shutter blades 3, 4 begin to overlap to form a gradually increasing light transmitting aperture to allow the scene light to pass through the openings $1b$ and $7a$.

Thus, the photoelectric current is generated in the photoelectric element 14 which is amplified by the operational amplifier 15 wherein a suppressed voltage proportional to the logarithm of the photoelectric current of the photoelectric element 14 is generated at the output terminal of the operational amplifier 15 by virtue of the feed-back connection of the logarithmic diode 16 to the operational amplifier 15. Therefore, a current proportional to the photoelectric current is flown into the logarithmic extension transistor 17 so that an electric charge corresponding to the integrated value of the quantity of the scene light received by the photoelectric element 14 begins to be stored in the capacitor 18.

Therefore, the voltage $V_3$ at the end of the capacitor 18 connected to the collector of the transistor 17, i.e. at the point a which is connected to the non-inverted input terminal of the comparator 20 begins to be lowered gradually until the decreasing voltage $V_3$ becomes to be equal to the reference voltage $V_2$ supplied to the inverted input terminal of the comparator 20 at which time the output of the comparator 20 is inverted to the L level so that the AND gate 26 is closed to render the output thereof to be at the L level and render the transistor 30 to be non-conductive so as to cut off the current flowing through the shutter blade driving coils thereby moving the shutter blades 3, 4 to their shutter closing positions by the action of the springs 10, 11 for completing the proper exposure of the shutter.

In the operation described above, when the voltage of the electric source Vcc varies or is lowered from the predetermined rating voltage for some reasons, the electromagnetic force generated by the driving coils is weakened so that the shutter speed is lowered thereby tending to result in the underexposure of the shutter.

In the present invention, however, the reference voltage $V_2$ supplied to the inverted input terminal of the comparator 20 is also varied or lowered as the voltage Vcc of the electric source varies or is lowered, and, therefore, the time period until the output of the comparator 20 is inverted from the H level to the L level is made longer correspondingly to the variation or lowering of the voltage of the electric source in comparison with the time period occurring in the case of the normal rating voltage of the electric source so as to compensate for the lowered shutter speed. Therefore, the time period during which the shutter blade driving coils are energized is made longer correspondingly and the lowered shutter speed is compensated for to achieve the proper exposure of the shutter regardless of the variation or the lowering of the voltage of the electric source.

The reference voltage $V_2$ of the reference voltage generating circuit of the present invention is:

$$V_2 = V_1 \times \frac{R_{24} + R_{25}}{R_{24}} \quad (1)$$

where:
$R_{24}$=the resistance value of the resistor 24
$R_{25}$=the resistance value of the resistor 25.
On the other hand:

$$V_1 = V_{cc} \times \frac{R_{22}}{R_{22} + R_{21}} \quad (2)$$

where:
$R_{21}$=the resistance value of the resistor 21
$R_{22}$=the resistance value of the resistor 22.
Substituting the equation (2) for the equation (1):

$$V_2 = V_{cc} \times \frac{(R_{24} + R_{25}) \times R_{22}}{(R_{22} + R_{21}) \times R_{24}} \quad (3)$$

As seen in the equation (3), the reference voltage $V_2$ varies depending upon the variation in the voltage Vcc of the electric source. In this case, the operational amplifier 23 and the resistors 24, 25 serve to set the reference voltage $V_2$ to the optimum condition for achieving the proper exposure of the shutter.

The scene light information indicating voltage $V_3$ at the point a is:

$$V_3 = V_2 - \frac{i}{c} t$$

where:
i=the electric current
c=the capacity of the capacitor 18
t=the time as measured from the opening of the trigger switch 19
$V_2$=the constant voltage supplied by a simple type constant voltage circuit.

As described previously, the shutter is closed for the proper exposure when $V_2 = V_3$, wherein it is seen that the time t varies correspondingly to the variation in the voltage of the electric source while the reference voltage $V_2$ varies as the voltage of the electric source varies so that the proper exposure is achieved regardless of the variation in the voltage of the electric source.

Figure 5:
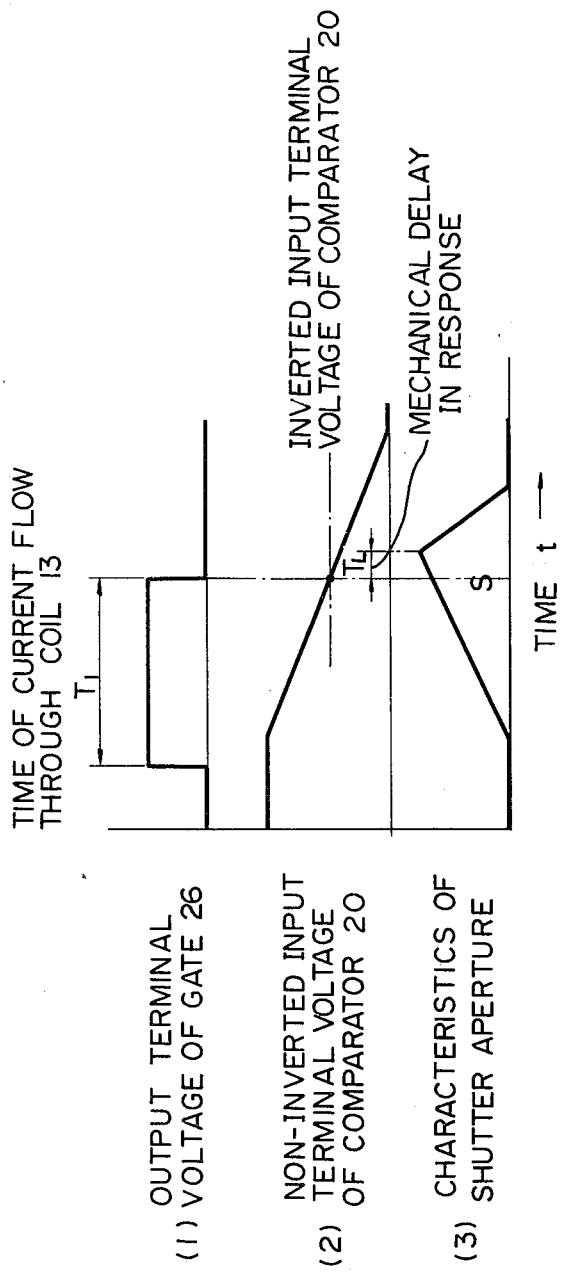
FIG. 5 is a diagram showing the operation of the shutter of FIG. 1 controlled by the control circuit of FIG. 4 under the normal condition of the electric source generating the standard voltage.

FIG. 5 shows the operation of the shutter as controlled by the above described control circuit under the condition of the normal rating voltage of the electric source. As shown, after some mechanical time lag $T_L$ after the shutter blades have been opened by the energization of the driving coils during the time $T_1$, the shutter blades commence to reverse their movement to the shutter closing direction so that the operation of the shutter blades is completed for the proper exposure wherein the integrated area S assumes the area representing the proper exposure.

Figure 6:
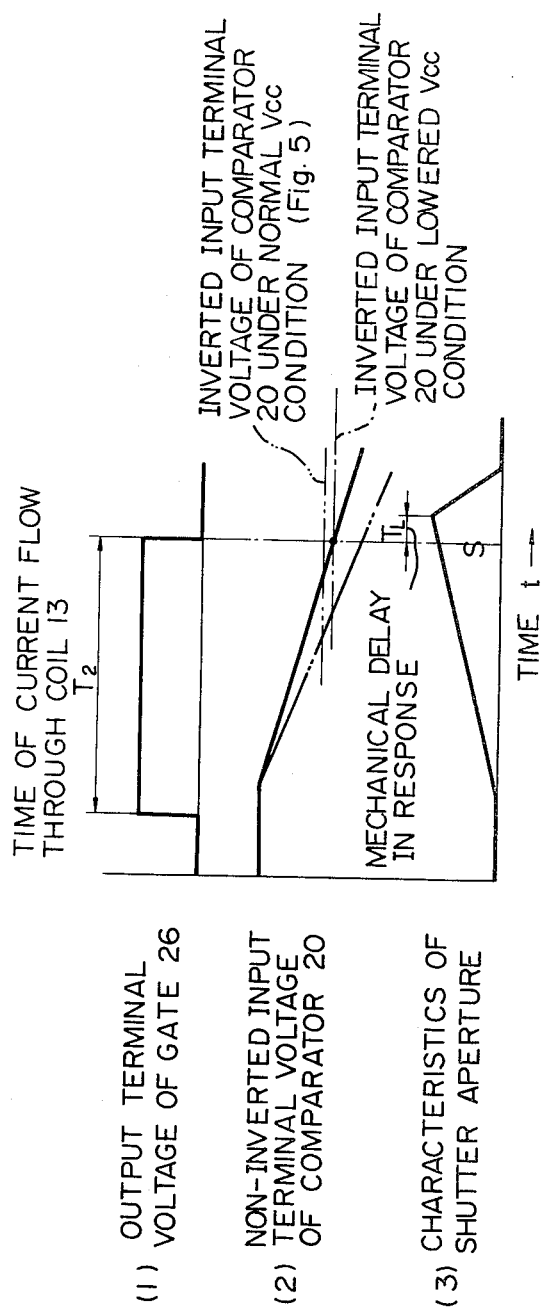
FIG. 6 is a diagram similar to FIG. 5 but showing the operation of the shutter of FIG. 1 controlled by the control circuit of FIG. 4 under the condition of the electric source generating a lowered voltage than the standard voltage.

FIG. 6 shows the operation of the shutter blades by the central of the control circuit of FIG. 4 under the condition that the voltage Vcc of the electric source is lowered from the normal rating voltage. In this case, it is seen that the shutter speed is lowered in comparison with the case of FIG. 5 but the time $T_2$ of energizing the driving coils is made correspondingly longer than the time $T_1$ of the case of FIG. 5 so as to render the integrated area S to be equal to that of the case of FIG. 5 thereby achieving the proper exposure of the shutter.

Figure 7:
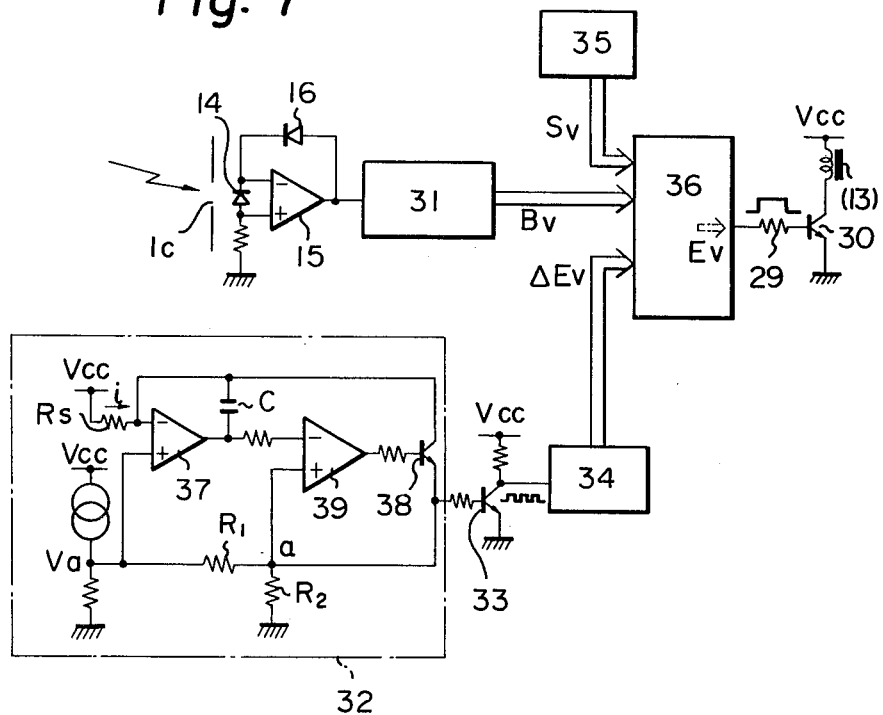
FIG. 7 is a diagram showing another embodiment of the control circuit of the present invention.

FIG. 7 shows another embodiment of the control circuit of the present invention constructed as a digital control circuit.

The control circuit of FIG. 7 comprises in like manners as that shown in FIG. 4 a scene light information detecting circuit consisting of a photodiode or a photoelectric element 14, an operational amplifier 15 having a feed-back diode 16 of the logarithmically suppressing type, and a resistor 29 and a transistor 30 connected to the shutter blade driving coils, all the above components being similar to those shown in FIG. 4. The control circuit of FIG. 7 comprises a first digital conversion circuit 31 having its input terminal connected to the output of the scene light information detecting circuit for converting the scene light information indicating output voltage into a digital scene light information indicating output signal $B_V$, a second digital conversion circuit 32 for converting the variation in the voltage Vcc of the electric source into a digital frequency variation indicating signal, a transistor 33 having its base connected through a resistor to the output of the second conversion circuit 32 and its collector connected through a resistor to the electric source Vcc with its emitter being grounded, an encoding circuit 34 having its input terminal connected to the collector of the transistor 33 for counting and encoding the digital frequency variation indicating signal from the conversion circuit 32 so as to generate an output signal $\Delta E_V$ for compensating for the variation in the voltage Vcc of the electric source, and an exposure factor or information introducing circuit 35 for generating an exposure information signal $S_V$ such as the film sensitivity, and an operation processing circuit 36 having its input terminals connected to the output signal of the digital scene light information conversion circuit 31, the encoding circuit 34 and the exposure information introducing circuit 35, respectively.

Thus, the operation processing circuit 36 carries out the operation on the basis of the input signals $S_V$, $B_V$ and $\Delta E_V$ so as to obtain an output $E_V = S_V + B_V + \Delta E_V$ thereby permitting the shutter blade driving pulse corresponding to the $E_V$ by virtue of the predetermined program set in the circuit 36 which is supplied through the resistor 29 to the transistor 30 for energizing the shutter blade driving coils to actuate the shutter blades 3, 4 for the proper exposure in like manner as in the case of the control circuit of FIG. 4.

The above described source voltage frequency conversion circuit 32 includes an operational amplifier 37 which receives the voltage Vcc of the electric source at its inverted input terminal through a resistor $R_S$ and receives the reference voltage Va at its non-inverted input terminal while a capacitor C is connected between its output terminal and its inverted input terminal, and a comparator 39 having its inverted input terminal connected to the output terminal of the operational amplifier 37 through a resistor and its non-inverted input terminal connected to the voltage dividing point a of a voltage dividing circuit consisting of series connected resistors $R_1$, $R_2$ for dividing the reference voltage Va with its output terminal connected to the base of a transistor 38 through a resistor. The emitter of the transistor 38 is connected to the base of the transistor 33 and to the voltage dividing point a of the voltage dividing circuit consisting of the resistors $R_1$, $R_2$, while the collector of the transistor 38 is connected to the inverted input terminal of the operational amplifier 37.

Thus, the conversion circuit 32 can provide pulsating output voltage of the operational amplifier 37 and periodical input voltage to the non-inverted input terminal of the comparator 39 as illustrated in FIG. 8.

The time T of the input voltage to the non-inverted input terminal of the comparator 39 shown in FIG. 8 is:

$$T = \frac{C\left(Va - \frac{R_1}{R_2} Va\right)}{i}$$

$$= \frac{CR_S Va\left(1 - \frac{R_1}{R_2}\right)}{Vcc - Va}$$

where:
C = the capacity of the capacitor C
$R_S$ = the resistance value of the resistor $R_S$
$R_1$ = the resistance value of the resistor $R_1$
$R_2$ = the resistance value of the resistor $R_2$
Va = the reference voltage
i = the current flowing through the resistor $R_S$.

The shutter blades 3, 4 are urged to the shutter closing positions by means of the springs 10, 11 and are moved in the shutter opening direction by the energization of the shutter blade driving coils, but, in this case, the photoelectric element 14 receives the scene light at all times independently of the movement of the shutter blades 3, 4.

Figure 9:
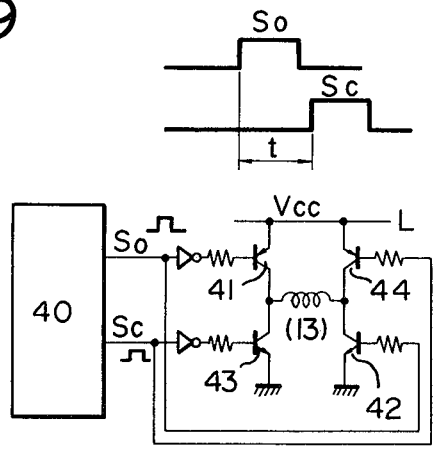
FIG. 9 is a fragmentary circuit diagram showing a further embodiment of the control circuit of the present invention wherein both the opening and closing operations of the shutter blades are effected by the electric pulses.

FIG. 9 shows a further embodiment of the control circuit of the present invention wherein the shutter blades are moved to the shutter closing positions and in the shutter opening direction without the action of the springs by supplying to the shutter blade driving coils the electric current in the forward direction and in the reverse direction so as to achieve the proper exposure.

In FIG. 9, the operation processing circuit 40 receives in like manner as in the case of FIG. 7 the output $B_V$ of the scene light information detecting digital conversion circuit 31, the output $\Delta E_V$ of the source voltage variation encoding circuit 34 and the output $S_V$ of the exposure information setting circuit 35 and carries out operations according to the program set therein so as to generate a shutter opening output pulse $S_o$ and, after a predetermined time t after the issuance of the shutter opening output pulse $S_o$ depending upon the brightness of the scene light, a shutter closing output $S_c$. The pulse $S_o$ is connected to the base of a transistor 41 of the N type, for example, through an inverter and a resistor and also to the base of a transistor 42 of the P type, for example, through a resistor, while the pulse $S_c$ is connected to the base of a transistor 43 of the P type, for example, through an inverter and a resistor and also to the base of a transistor 44 of the N type, for example, through a resistor, the emitters of the transistors 41, 44 being connected to the electric source Vcc and the emitters of the transistors 42, 43 being grounded.

The collectors of the transistors 41, 43 are connected to one end each of the shutter blade driving coils while the collectors of the transistors 42, 44 are connected to the other end each of the driving coils. The connection of the driving coils are so selected that, when the current is flown therethrough by the issuance of the pulse $S_o$ as described below, the shutter blades are moved in the shutter opening direction, while the shutter blades are moved to the shutter closing positions when the current is flown through the driving coils by the issuance of the pulse $S_c$.

With the control circuit described above, when the pulse $S_o$ is issued by the operation of the shutter, the transistors 41, 42 are rendered to be conductive, while the transistors 43, 44 are held non-conductive insofar as the pulse $S_c$ is not yet issued, so that current from the electric source Vcc is flown in the direction from the transistor 41 through the driving coils to the transistor 42 thereby moving the shutter blades 3, 4 in the shutter opening direction. After the predetermined time t after the issuance of the pulse $S_o$ as determined by the brightness of the scene light, the pulse $S_c$ is issued, and the transistors 43, 44 are switch into the conductive state while the transistors are rendered to be non-conductive so that the direction of the current flown through the driving coils is reversed thereby closing the shutter blades for completing the proper exposure.

Figure 10:
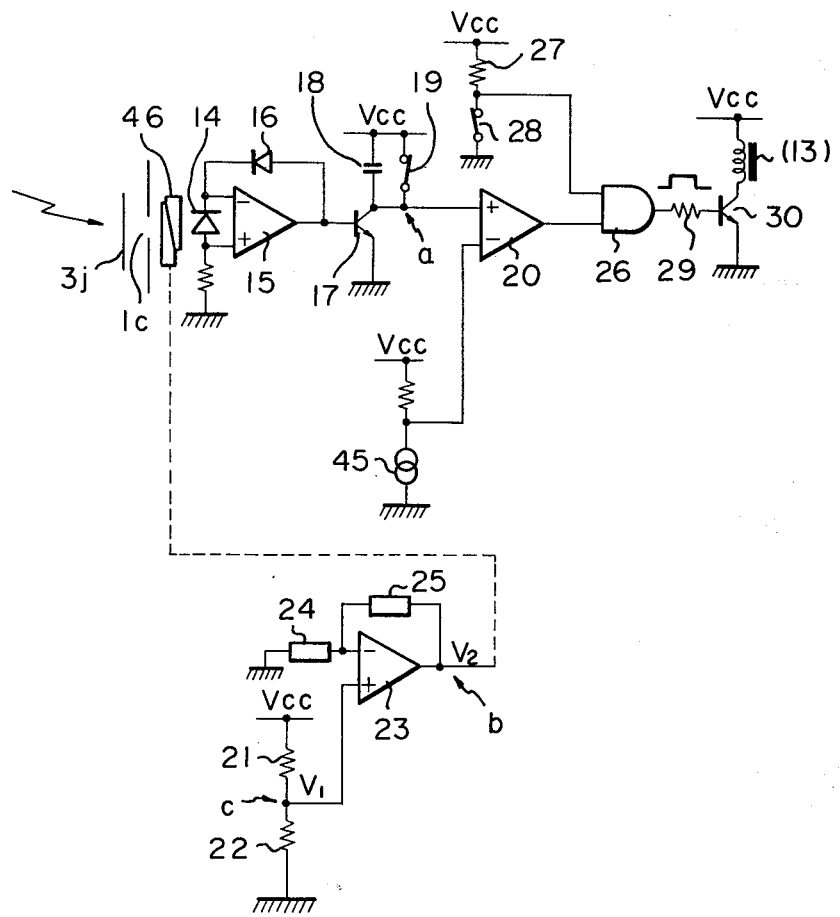
FIG. 10 is a diagram showing a still further embodiment of the control circuit of the present invention wherein a scene light information compensating means is utilized so as to modify the proper exposure defining pulse in response to the variation in the voltage of the electric source.

FIG. 10 shows a still further embodiment of the control circuit of the present invention, wherein the reference voltage per se is not compensated for the variation in the voltage of the electric source, but the brightness of the scene light received by the photoelectric element 14 is varied correspondingly to the variation in the voltage Vcc of the electric source so as to control the duration of the shutter blade driving pulse for achieving the proper exposure.

In FIG. 10, the general construction of the circuit shown is similar to that shown in FIG. 4 except that the inverted input terminal of the comparator 20 receives a constant reference voltage as given by a constant current circuit 45 and a scene light information compensating means 46 of the well known teardrop-type variable aperture or of the well known wedge-type variable density neutral gray filter is arranged in the optical path to the photoelectric element 14, and the scene light information compensating means 46 is controlled through a well known actuating means (not shown) by the output voltage $V_2$ of the operational amplifier 23 which varies correspondingly to the variation in the voltage of the electric source Vcc thereby lowering, for example, the brightness of the scene light received by the photoelectric element 14 in case the voltage Vcc of the electric source is lowered, for example, for elongating the duration of the energization of the driving coils so as to achieve the proper exposure.

Figure 11:
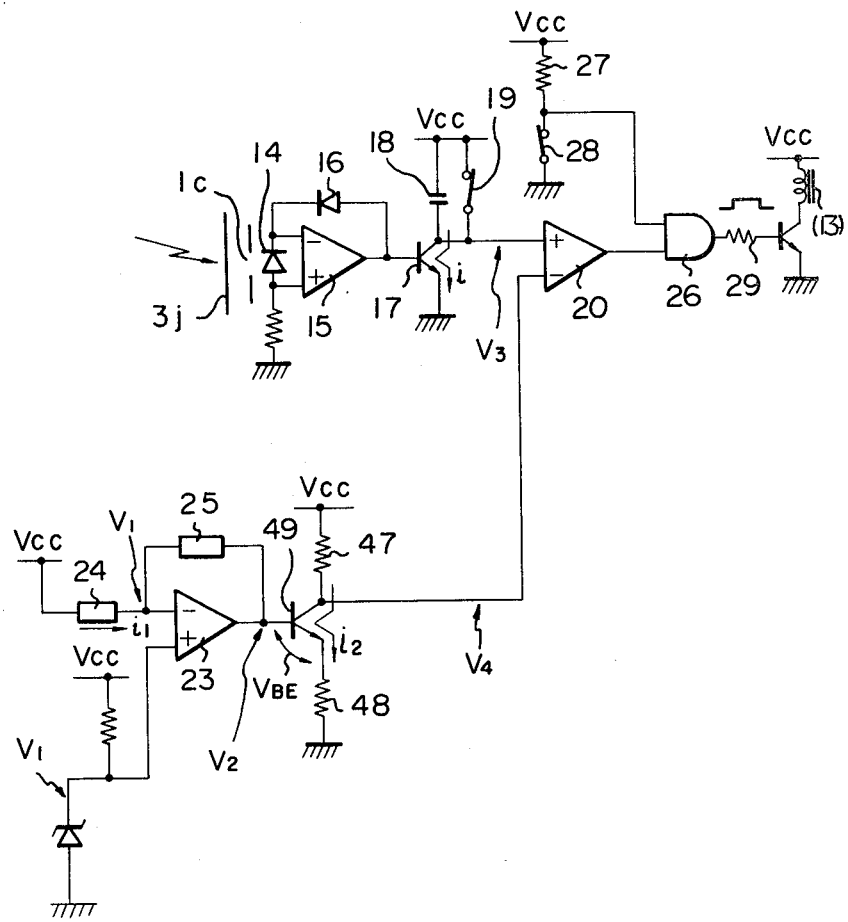
FIG. 11 is a diagram showing the other embodiment of the control circuit of the present invention.

FIG. 11 shows the other embodiment of the control circuit of the present invention similar in general construction to that of FIG. 4 wherein, however, the constant voltage $V_2$ in FIG. 4 is changed to the source voltage Vcc in FIG. 11.

In this case, the current i, flowing through the resistor 24 is:

$$i_1 = \frac{V_{cc} - V_1}{R_{24}}$$

$$V_2 = V_1 - i_1 \times R_{25}$$

$$= V_1 - \frac{R_{25}}{R_{24}} \times (V_{cc} - V_1)$$

$$= \left(1 + \frac{R_{25}}{R_{24}}\right) V_1 - \frac{R_{25}}{R_{24}} \times V_{cc}$$

where:
$R_{24}$ = the resistance value of the resistor 24
$R_{25}$ = the resistance value of the resistor 25
$V_1$ = the constant voltage.

The collector voltage $V_4$ of the transistor 49 is:

$$V_4 = V_{cc} - R_{47} \times i_2$$

$$i_2 = \frac{V_2 - V_{BE}}{R_{48}}$$

where:
$R_{47}$ = the resistance value of the resistor 47
$R_{48}$ = the resistance value of the resistor 48
$i_2$ = the current flowing through the collector-emitter of the transistor 49
$V_{BE}$ = the base-emitter voltage of the transistor 49.
Therefore, $$V_4 = V_{cc} - \frac{R_{47}}{R_{48}}(V_2 - V_{BE})$$

Since the voltage $V_4$ is supplied to the inverted input terminal of the comparator 20, the output thereof is inverted when the input voltage $V_3$ supplied to the non-inverted input terminal of the comparator 20 becomes equal to the voltage $V_4$.

$$V_3 = V_{cc} - \frac{i}{C}t$$

where:
i = the current flowing through the transistor 17
C = the capacity of the capacitor 18
t = the time elapsed from the opening of the trigger switch 19.
Therefore, $$\frac{R_{47}}{R_{48}}(V_2 - V_{BE}) = \frac{i}{C}t$$

$$\therefore t = \frac{i}{C} \times \frac{R_{47}}{R_{48}}(V_2 - V_{BE})$$

Since the voltage $V_{BE}$ is substantially constant, $$t \propto V_2 \propto -V_{cc}$$

Thus, the time t is made longer as the voltage Vcc decreases resulting in the lowered speed of the shutter blades, thereby compensation for the lowered shutter speed so as to achieve the proper exposure.

Figure 12:
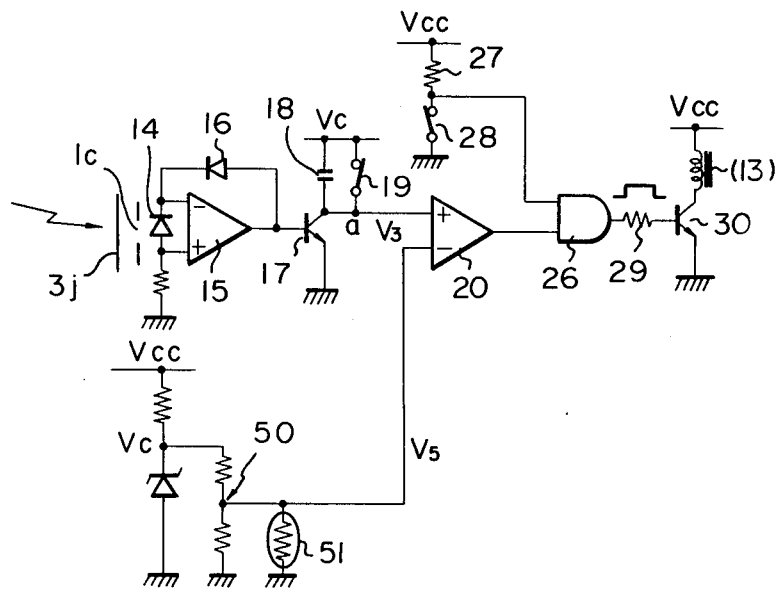
FIG. 12 is a diagram showing an embodiment of the control circuit o present invention wherein the reference voltage is modified by the temperature detecting circuit in response to the variation in the temperature which affects the actuation of the shutter blades.

FIG. 12 shows an embodiment of the control circuit of the present invention wherein the proper exposure, i.e. the accurate operation of the shutter is insured regardless of the variation in the ambient temperature affecting the resistance value of the shutter blade driving coils which results in the variation in the electromagnetic force or in the variation in the shutter speed.

The control circuit shown in FIG. 12 is similar in general construction to that shown in FIG. 4 except that a voltage dividing circuit 50 consisting of a pair of series connected resistors is connected to a simple type constant voltage circuit $V_c$ so as to provide a divided reference voltage $V_5$ which is supplied to the inverted input terminal of the comparator 20 as well as to the capacitor 18 as shown.

The characteristic feature of this control circuit lies in the fact that a temperature detecting circuit 51 is connected to the divided reference voltage $V_5$ as shown in FIG. 12 and the temperature detecting circuit 51 is located in a position where the temperature of the shutter blade driving coils can be exactly detected.

Figure 13:
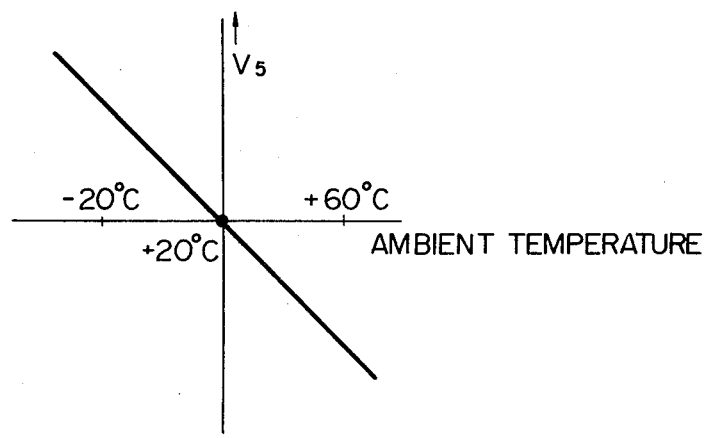
FIG. 13 is a diagram showing the variation in the reference voltage as compensated for by the temperature detecting circuit in response to the variation in the temperature.

The temperature characteristics of the temperature detecting circuit 51 is so selected that the divided reference voltage $V_5$ is lowered as the ambient temperature varies from the lower temperature to the higher temperature under a predetermined appropriate condition as illustrated in FIG. 13.

Thus, when the shutter release button is actuated for the operation of the shutter as described previously, the shutter opening 1b and the photoelectric element 14 are uncovered so that the capacitor 18 begins to be charged. Therefore, the input voltage $V_3$ supplied to the non-inverted input terminal of the comparator 20 is gradually lowered from the constant voltage $V_c$, and, when the lowered voltage is made equal to the divided reference voltage $V_5$, the output of the comparator 20 is inverted and the shutter blades 3, 4 are moved to the shutter closing positions so as to achieve the proper exposure in the manner described previously.

When the temperature of the shutter blade driving coils is lowered, for example, so that the resistance value thereof is reduced resulting in the increased current flowing therethrough and, hence, in the increased electromagnetic force thereby increasing the shutter speed, the reference voltage $V_5$ is also increased by virtue of the provision of the temperature detecting circuit 51. Therefore, the time required until the scene light information detecting voltage $V_3$ is lowered to reach the reference voltage $V_5$ is shortened correspondingly to the lowered temperature, and the time of energization of the driving coils is shortened so as to compensate for the increased shutter speed thereby achieving the proper exposure.

FIG. 14 shows the operation of the control circuit of FIG. 12 and the operation of the shutter controlled thereby. In FIG. 14, (1) shows the conditions of operation under the normal temperature, and (2) shows those at a lowered temperature, while (3) shows those at a higher temperature.

In the above description, the duration of the shutter blade driving pulse is varied in response to the variation in temperature. However, it is also possible to convert the voltage informations into digital frequency varying informations.

What is claimed is:
1. In a control circuit for an electromagnetically driven programming shutter having magnets and shutter blade driving coils provided on the respective shutter blades of said shutter and electromagnetically coop- erating with said magnets, said shutter blades being actuated for opening and/or closing operation when said driving coils are energized, said control circuit having an electric source for energizing said driving coils, a scene light information detecting circuit including a photoelectric element adapted to receive the scene light in coupled relationship to the opening and closing operations of said shutter blades so as to generate a scene light information indicating output voltage, a reference voltage generating circuit adapted to be energized by said electric source so as to generate a reference output voltage for obtaining a proper exposure of said shutter by comparing the same with said scene light information indicating output voltage, and a comparator adapted to receive said scene light information indicating output voltage and said reference output voltage and compare the former with the latter so as to generate a controlled proper exposure defining output pulse, said controlled proper exposure defining output pulse being supplied to said shutter blade driving coils so that said shutter is actuated for the proper exposure in cooperation with said magnets, the improvement wherein said reference voltage generating circuit comprises a voltage compensating circuit capable of varying said reference output voltage as a function of the variation in the voltage of said electric source thereby permitting said controlled proper exposure defining output pulse to be modified so as to compensate for the variation in the actuation of said shutter blades caused by the variation in the electromagnetic force generated by said shutter blade driving coils due to the variation in the voltage of said electric source.

2. Control circuit as set forth in claim 1, wherein said voltage compensating circuit comprises a circuit for varying the duration of said controlled proper exposure defining output pulse in response to the variation in the voltage of said electric source.

3. Control circuit as set forth in claim 1, wherein said shutter comprises springs for urging the respective shutter blades of said shutter to the closed position of said shutter, said shutter blades being driven in the shutter opening direction against the action of said springs when said shutter blade driving coils are energized by said controlled proper exposure defining output pulse.

4. In a control circuit for an electromagnetically driven programming shutter having magnets and shutter blade driving coils provided on the respective shutter blades and electromagnetically cooperating with said magnets, said shutter blades being actuated for opening and/or closing operation when said driving coils are energized, said control circuit having an electric source for energizing said driving coils, a scene light information detecting circuit including a photoelectric element adapted to receive the scene light so as to generate a scene light information indicating output voltage, a reference voltage generating circuit adapted to be energized by said electric source so as to generate a reference output voltage for obtaining a proper exposure of said shutter by comparing the same with said scene light information indicating output voltage, and a comparator adapted to receive said scene light information indicating output voltage and said reference output voltage and compare the former with the latter so as to generate a controlled proper exposure defining output pulse, said controlled proper exposure defining output pulse being supplied to said shutter blade driving coils so that said shutter is actuated for the proper exposure in cooperation with said magnets, the improvement wherein said reference voltage generating circuit comprises a voltage compensating circuit capable of varying said reference output voltage as a function of the variation in the voltage of said electric source thereby permitting said controlled proper exposure defining output pulse to be modified so as to compensate for the variation in the actuation of said shutter blades caused by the variation in the electromagnetic force generated by said shutter blade driving coils due to the variation in the voltage of said electric source, and said control circuit further comprises a first digital conversion circuit for converting said scene light information indicating output voltage into a digital scene light information indicating output signal, a second digital conversion circuit for converting said reference output voltage of said voltage compensating circuit into a digital reference output signal, and an operation processing circuit adapted to receive both said digital output signals so as to generate said controlled proper exposure defining output pulse by said operation processing circuit.

5. Control circuit as set forth in claim 4, further comprising an information introducing circuit for introducing an exposure information such as the film sensitivity into said operation processing circuit.

6. Control circuit as set forth in claim 4, wherein said shutter comprises springs for urging the respective shutter blades of said shutter to the closed position of said shutter, said shutter blades being driven in the shutter opening direction against the action of said springs when said shutter blade driving coils are energized by said controlled proper exposure defining output pulse.

7. In a control circuit for an electromagnetically driven programming shutter having magnets and shutter blade driving coils provided on the respective shutter blades and electromagnetically cooperating with said magnets, said shutter blades being actuated for opening and/or closing operation when said driving coils are energized, said control circuit having an electric source for energizing said driving coils, a scene light information detecting circuit including a photoelectric element adapted to receive the scene light so as to generate a scene light information indicating output voltage, a reference voltage generating circuit adapted to be energized by said electric source so as to generate a reference output voltage for obtaining a proper exposure of said shutter by comparing the same with said scene light information indicating output voltage, and a comparator adapted to receive said scene light information indicating output voltage and said reference output voltage and compare the former with the latter so as to generate a controlled proper exposure defining output pulse, said controlled proper exposure defining output pulse being supplied to said shutter blade driving coils so that said shutter is actuated for the proper exposure in cooperation with said magnets, the improvement wherein said reference voltage generating circuit comprises a voltage compensating circuit capable of varying said reference output voltage as a function of the variation in the voltage of said electric source thereby permitting said controlled proper exposure defining output pulse to be modified so as to compensate for the variation in the actuation of said shutter blades caused by the variation in the electromagnetic force generated by said shutter blade driving coils due to the variation in the voltage of said electric source, and said control circuit further comprises a first digital conversion circuit for converting said scene light information indicating output voltage into a digital scene light information indicating output signal, a second digital conversion circuit for converting said reference output voltage of said voltage compensating circuit into a digital reference output signal, an operation processing circuit adapted to receive both said digital output signals so as to generate a shutter blade opening signal and a shutter blade closing signal which is issued after a controlled time period from the issuance of said shutter blade opening signal corresponding to said scene light information indicating signal as well as to the variation in the voltage of said electric source, and a shutter blade actuating circuit adapted to receive said shutter blade opening signal and said shutter blade closing signal, said shutter blade driving coils being energized upon supply of said shutter blade opening signal to said shutter blade actuating circuit in the direction for driving said shutter blades in the shutter opening direction, while said shutter blade driving coils are switched upon supply of said shutter blade closing signal to said shutter blade actuating circuit so as to be energized in the direction for driving said shutter blades in the shutter closing direction.

8. Control circuit as set forth in claim 7, further comprising an information introducing circuit for introducing an exposure information such as the film sensitivity into said operation processing circuit.

9. In a control circuit for an electromagnetically driven programming shutter having magnets and shutter blade driving coils provided on the respective shutter blades of said shutter and electromagnetically cooperating with said magnets, said shutter blades being actuated for opening and/or closing operation when said driving coils are energized, said control circuit having an electric source for energizing said driving coils, a scene light information detecting circuit including a photoelectric element adapted to receive the scene light in coupled relationship to the opening and closing operations of said shutter blades so as to generate a scene light information indicating output voltage, a reference voltage generating circuit adapted to be energized by said electric source so as to generate a reference output voltage for obtaining a proper exposure of said shutter by comparing the same with said scene light information indicating output voltage, and a comparator adapted to receive said scene light information indicating output voltage and said reference output voltage and compare the former with the latter so as to generate a controlled proper exposure defining output pulse, said controlled proper exposure defining output pulse being supplied to said shutter blade driving coils so that said shutter is actuated for the proper exposure in cooperation with said magnets, the improvement wherein said reference voltage generating circuit comprises a voltage compensating circuit capable of varying said reference output voltage as a function of the variation in the voltage of said electric source, a scene light information compensating means for varying the brightness of the scene light received by said photoelectric element, and driving means controlled by said voltage compensating circuit for driving said scene light information compensating means so as to vary the brightness of the scene light received by said photoelectric element correspondingly to the output of said voltage compensating circuit thereby permitting said controlled proper exposure defining output pulse to be modified so as to compensate for the variation in the actuation of said shutter blades caused by the variation in the electromagnetic force generated by said shutter blade driving coils due to the variation in the voltage of said electric source.

10. Control circuit as set forth in claim 9, wherein said scene light information compensating means comprises a variable aperture diaphragm located in front of said photoelectric element.

11. Control circuit as set forth in claim 9, wherein said scene light information compensating means comprises a variable density neutral gray wedge type filter located in front of said photoelectric element.

12. Control circuit as set forth in claim 9, wherein said shutter comprises springs for urging the respective shutter blades of said shutter to the closed position of said shutter, said shutter blades being driven in the shutter opening direction against the action of said springs when said shutter blade driving coils are energized by said controlled proper exposure defining output pulse.

13. Control circuit for an electromagnetically driven programming shutter having magnets and shutter blade driving coils provided on the respective shutter blades of said shutter and electromagnetically cooperating with said magnets, said shutter blades being actuated for opening and/or closing operation when said driving coils are energized, said control circuit having an electric source for energizing said driving coils, a scene light information detecting circuit including a photoelectric element adapted to receive the scene light in coupled relationship to the opening and closing operations of said shutter blades so as to generate a scene light information indicating output voltage, a reference voltage generating circuit adapted to be energized by said electric source so as to generate a reference output voltage for obtaining a proper exposure of said shutter by comparing the same with said scene light information indicating output voltage, and a comparator adapted to receive said scene light information indicating output voltage and said reference output voltage and compare the former with the latter so as to generate a controlled proper exposure defining output pulse, said controlled proper exposure defining output pulse being supplied to said shutter blade driving coils so that said shutter is actuated for the proper exposure in cooperation with said magnets, wherein the improvement comprises a temperature detecting circuit having a predetermined temperature characteristics and arranged at a position where the temperature of said shutter blade driving coils can be detected thereby, said temperature detecting circuit being connected to said reference voltage generating circuit thereby permitting said reference output voltage to be modified by virtue of the temperature characteristics of said temperature detecting circuit so as to compensate for the variation in the actuation of said shutter blades caused by the variation in the electromagnetic force generated by said shutter blade driving coils due to the variation in the temperature.

* * * * *